US012113315B2

(12) United States Patent
Murabayashi et al.

(10) Patent No.: US 12,113,315 B2
(45) Date of Patent: Oct. 8, 2024

(54) SHIELD CONNECTOR

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yorikazu Murabayashi, Yokkaichi (JP); Hiroyuki Kodama, Yokkaichi (JP); Kazuya Kobayashi, Yokkaichi (JP); Suguru Yamagishi, Osaka (JP); Toyohisa Takano, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/613,769

(22) PCT Filed: Jun. 5, 2020

(86) PCT No.: PCT/JP2020/022369
§ 371 (c)(1),
(2) Date: Nov. 23, 2021

(87) PCT Pub. No.: WO2020/250832
PCT Pub. Date: Dec. 17, 2020

(65) Prior Publication Data
US 2022/0231462 A1 Jul. 21, 2022

(30) Foreign Application Priority Data
Jun. 13, 2019 (JP) ................................ 2019-110138

(51) Int. Cl.
*H01R 13/6474* (2011.01)
*H01R 24/38* (2011.01)
*H01R 24/44* (2011.01)

(52) U.S. Cl.
CPC ......... *H01R 13/6474* (2013.01); *H01R 24/44* (2013.01); *H01R 24/38* (2013.01)

(58) Field of Classification Search
CPC .............. H01R 13/646; H01R 13/6473; H01R 13/6474; H01R 24/38; H01R 24/40; H01R 24/42; H01R 24/44; H01R 13/645
See application file for complete search history.

(56) References Cited

U.S. PATENT DOCUMENTS 9,203,184 B1 * 12/2015 Hui ...................... H01R 13/629
2018/0241151 A1 8/2018 Lane et al.

FOREIGN PATENT DOCUMENTS

CN 106921065 A 7/2017
JP H01-209679 A 8/1989
(Continued)

OTHER PUBLICATIONS

KR-101871957-B1 translation.*
Aug. 25, 2020 Search Report issued in International Patent Application No. PCT/JP2020/022369.

*Primary Examiner* — Renee S Luebke
*Assistant Examiner* — Paul D Baillargeon
(74) *Attorney, Agent, or Firm* — Oliff PLC

(57) ABSTRACT

A connector includes a female terminal module and a male terminal module that is to be coupled to the female terminal module. The female terminal module includes a female-side inner conductor, a female-side derivative, and a female-side outer conductor. The female-side outer conductor receives therein the female-side inner conductor via the female-side derivative. The male terminal module includes a male-side inner conductor, a male-side derivative, and a male-side
(Continued)

outer conductor. The male-side outer conductor receives therein the male-side inner conductor via the male-side derivative and is connected to the female-side outer conductor. The female-side fitting portion of the female-side derivative and the male-side fitting portion of the male-side derivative are fitted to each other with recess-protrusion fitting. The male-side inner conductor includes a male connection portion and the male connection portion is inserted in the female-side fitting portion and connected to the female-side inner conductor.

4 Claims, 13 Drawing Sheets

(56) References Cited

FOREIGN PATENT DOCUMENTS

| | | | | | |
|---|---|---|---|---|---|
| JP | 2571132 | Y2 | | 5/1998 | |
| JP | 2002-190356 | A | | 7/2002 | |
| JP | 2005-317267 | A | | 11/2005 | |
| KR | 101871957 | B1 | * | 7/2018 | ............ H01R 24/38 |

* cited by examiner

SHIELD CONNECTOR

TECHNICAL FIELD

The present disclosure relates to a connector.

BACKGROUND ART

For example, a connector for sending high frequency signals that is used in a vehicle is disclosed in Japanese Unexamined Patent Application Publication No. 2005-317267. The connector includes a female connector and a male connector. The female connector includes an outer conductor that receives an inner conductor via a derivative. The inner conductor is connected to a coaxial cable. The male connector includes an electrical grounding member that receives a core wire terminal via a male-side derivative. The core wire terminal is to be connected to a board.

According to the coupling of the female connector and the male connector of the connector, the derivative of the female connector and the derivative of the male connector are opposite each other in the coupling direction and the core wire terminal that protrudes frontward from the derivative of the male connector is inserted in the derivative of the female connector. Thus, the core wire terminal and the inner conductor are connected.

RELATED ART DOCUMENT

Patent Document

[Patent Document 1]
Japanese Unexamined Patent Application Publication No. 2005-317267

SUMMARY OF THE INVENTION

Problem to be Solved by the Invention

Generally, the characteristic impedance is set to a predefined value to perform impedance matching in a transmission line for transmitting high frequency signals. Therefore, the impedance matching is performed between the coaxial cable, the inner conductor, and the core wire terminal of the connector. However, in the above connector, a gap may be created between the derivative of the female connector and the derivative of the male connector when the female connector and the male connector are coupled together. If so, no derivative is between the core wire terminal and the electrically grounding member in the gap between the derivatives, and the relative permittivity in the gap is changed and the impedance in the gap becomes high. This may cause impedance mismatching in the gap and reflection of transmission signals are caused and this may lower transmission efficiency.

The technology of suppressing impedance change is disclosed herein.

Means for Solving the Problem

A connector described herein includes a female terminal module and a male terminal module that is to be coupled to the female terminal module. The female terminal module includes a female-side inner conductor that is electrically conductive, a female-side derivative that has insulating properties, and a female-side outer conductor that is electrically conductive. The female-side outer conductor receives therein the female-side inner conductor via the female-side derivative. The male terminal module includes a male-side inner conductor that is electrically conductive, a male-side derivative that has insulating properties, and a male-side outer conductor that is electrically conductive. The male-side outer conductor receives therein the male-side inner conductor via the male-side derivative and is connected to the female-side outer conductor when the female terminal module and the male terminal module are coupled together. The female-side derivative includes a female-side fitting portion. The male-side derivative includes a male-side fitting portion. When the female terminal module and the male terminal module are coupled together in a coupling direction, the female-side fitting portion and the male-side fitting portion are fitted to each other in the coupling direction with recess-protrusion fitting. The male-side inner conductor includes a male connection portion. The male connection portion extends further than the male-side fitting portion toward the female terminal module. When the female terminal module and the male terminal module are coupled together, the male connection portion is inserted in the female-side fitting portion and connected to the female-side inner conductor.

Advantageous Effects of Invention

According to the present disclosure, impedance change is suppressed.

MODES FOR CARRYING OUT THE INVENTION

Figure 1:
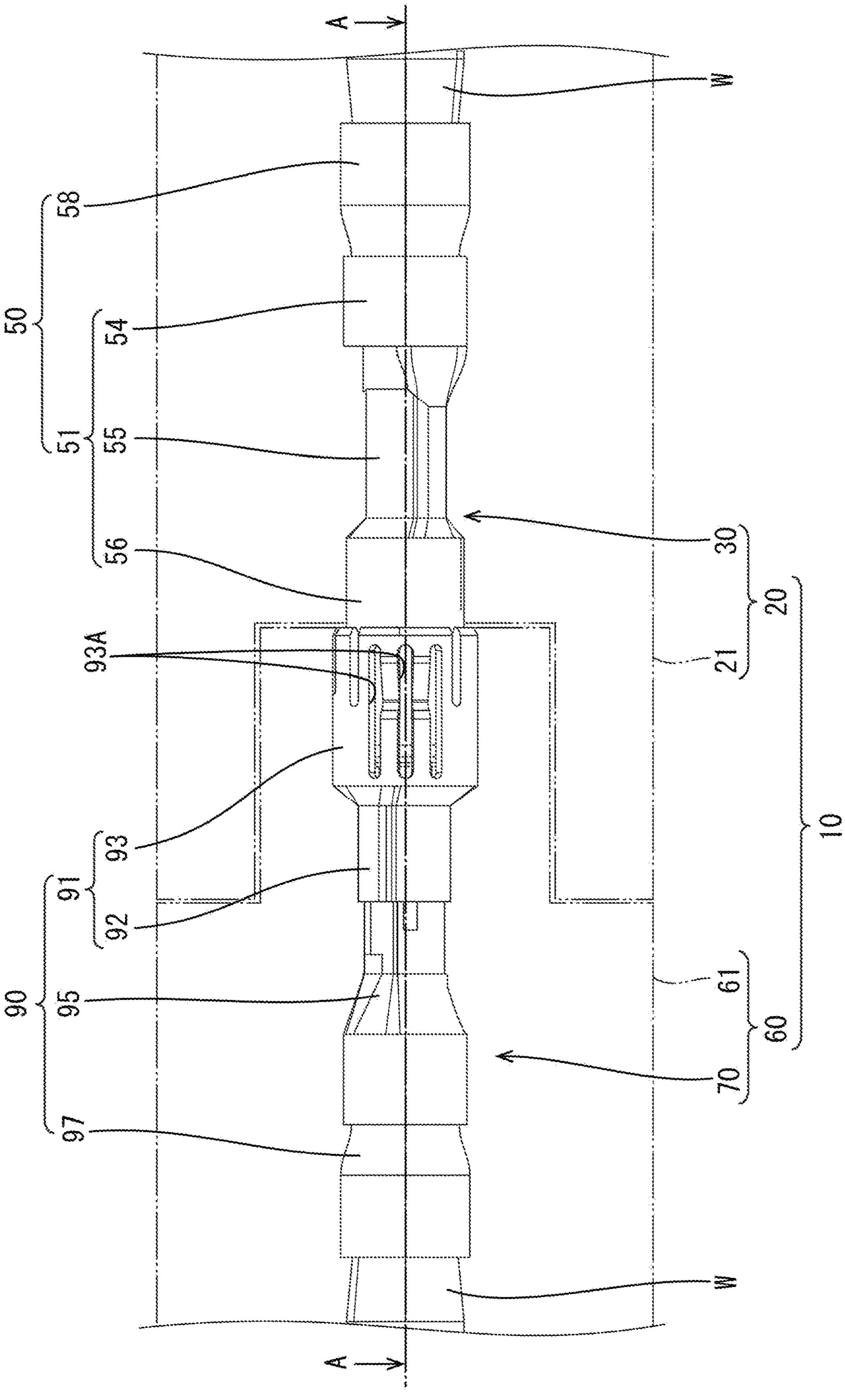
FIG. 1 is a side view of a connector according to one embodiment.

Description of Embodiments According to the Present Disclosure

First, embodiments according to the present disclosure will be listed and described.

(1) A connector includes a female terminal module and a male terminal module that is to be coupled to the female terminal module. The female terminal module includes a female-side inner conductor that is electrically conductive, a female-side derivative that has insulating properties, and a female-side outer conductor that is electrically conductive. The female-side outer conductor receives therein the female-side inner conductor via the female-side derivative. The male terminal module includes a male-side inner conductor that is electrically conductive, a male-side derivative that has insulating properties, and a male-side outer conductor that is electrically conductive. The male-side outer conductor receives therein the male-side inner conductor via the male-side derivative and is connected to the female-side outer conductor when the female terminal module and the male terminal module are coupled together. The female-side derivative includes a female-side fitting portion. The male-side derivative includes a male-side fitting portion. When the female terminal module and the male terminal module are coupled together in a coupling direction, the female-side fitting portion and the male-side fitting portion are fitted to each other in the coupling direction with recess-protrusion fitting. The male-side inner conductor includes a male connection portion. The male connection portion extends further than the male-side fitting portion toward the female terminal module. When the female terminal module and the male terminal module are coupled together, the male connection portion is inserted in the female-side fitting portion and connected to the female-side inner conductor.

When the male connection portion protruding from the male-side fitting portion is inserted in the female-side fitting portion and connected to the female-side inner conductor after the coupling of the female terminal module and the male terminal module, the female-side fitting portion and the male-side fitting portion are fitted to each other in the coupling direction with the recess-protrusion fitting. Therefore, at least the male-side fitting portion or the female-side fitting portion is disposed around the male connection portion.

Accordingly, the relative permittivity is less likely to be changed in the male connection portion and this keeps the impedance change to be small. Therefore, the reflection loss of high frequency signals can be made small and the transmission efficiency is less likely to be lowered.

(2) One fitting portion out of the female-side fitting portion and the male-side fitting portion is a protrusion member and includes a first tapered surface and other fitting portion out of the female-side fitting portion and the male-side fitting portion is a recessed member and includes a second tapered surface. The first tapered surface is sloped to be closer to an axis of the male connection portion as it extends closer to the other fitting portion. The second tapered surface is sloped to be closer to the axis of the male connection portion as it extends farther away from the one fitting portion and the second tapered surface extends along the first tapered surface.

Generally, a space is provided between a distal end of the male-side fitting portion and a distal end of the female-side fitting portion in a portion where the male connection portion is inserted into the female-side fitting portion. This prevents the male-side fitting portion from abutting on the female-side fitting portion in the coupling direction and the fitting of the fitting portions is not failed.

For example, if one fitting portion out of the male-side fitting portion and the female-side fitting portion has a circular columnar shape and other fitting portion out of the fitting portions includes a circular columnar recess, a space that is created around the outer periphery of the male connection near a recessed bottom of the recess has a diameter that is same as an inner diameter of the recess. Therefore, the impedance change tends to be great in the male connection.

However, according to the above configuration, the one fitting portion is the protrusion member including the first tapered surface and the other fitting portion is the recessed member including the second tapered surface.

Namely, the other fitting portion, which is the recessed member, has an inner space that becomes smaller as it is closer to the recessed bottom. This reduces the space around the outer periphery of the male connection portion near the recessed bottom of the other fitting portion. Accordingly, the impedance change in the male connection portion can be made much smaller and the reflection loss of high frequency signals in the male connection portion can be further decreased. Even if a first tapered surface and a second tapered surface are not completely contacted with each other, a space between the first tapered surface and the second tapered surface can be uniform and a local change of the impedance is less likely to be caused.

(3) The first tapered surface is formed in a conical shape that is tapered toward a distal end and the second tapered surface is formed in a conical shape whose diameter is reduced as it extends closer to a recessed bottom of the recessed member.

The other fitting portion, which is the recessed member, has a smaller space around the male connection portion and near the recessed bottom due to the second tapered surface. Therefore, the space between the male-side fitting portion and the female-side fitting portion can be made smaller compared to a configuration including a second tapered surface in a portion of the other fitting portion. Accordingly, the impedance change can be made much smaller and the reflection loss of high frequency signals can be further decreased.

(4) The first tapered surface and the second tapered surface are closely contacted with each other when the female terminal module and the male terminal module are coupled together.

The close contact between the first tapered surface and the second tapered surface further makes the space between the female-side fitting portion and the male-side fitting portion smaller. Accordingly, the impedance change can be made much smaller and the reflection loss of high frequency signals can be further reduced.

(5) The connector further includes a female housing in which the female terminal module is arranged, and a male housing in which the male terminal module is arranged and that can be coupled to the female housing.

Detail of Embodiment According to the Present Disclosure

Embodiments of the connector according to the present disclosure will be described with reference to the drawings. The present disclosure is not limited to the embodiments. All modifications within and equivalent to the technical scope of the claimed invention may be included in the technical scope of the present disclosure.

First Embodiment

A first embodiment according to the present disclosure will be described with reference to FIGS. 1 to 13.

A connector 10 according to this embodiment is for connecting electric devices installed in a vehicle and transmitting high frequency electric signals.

[Connector 10]

Figure 2:
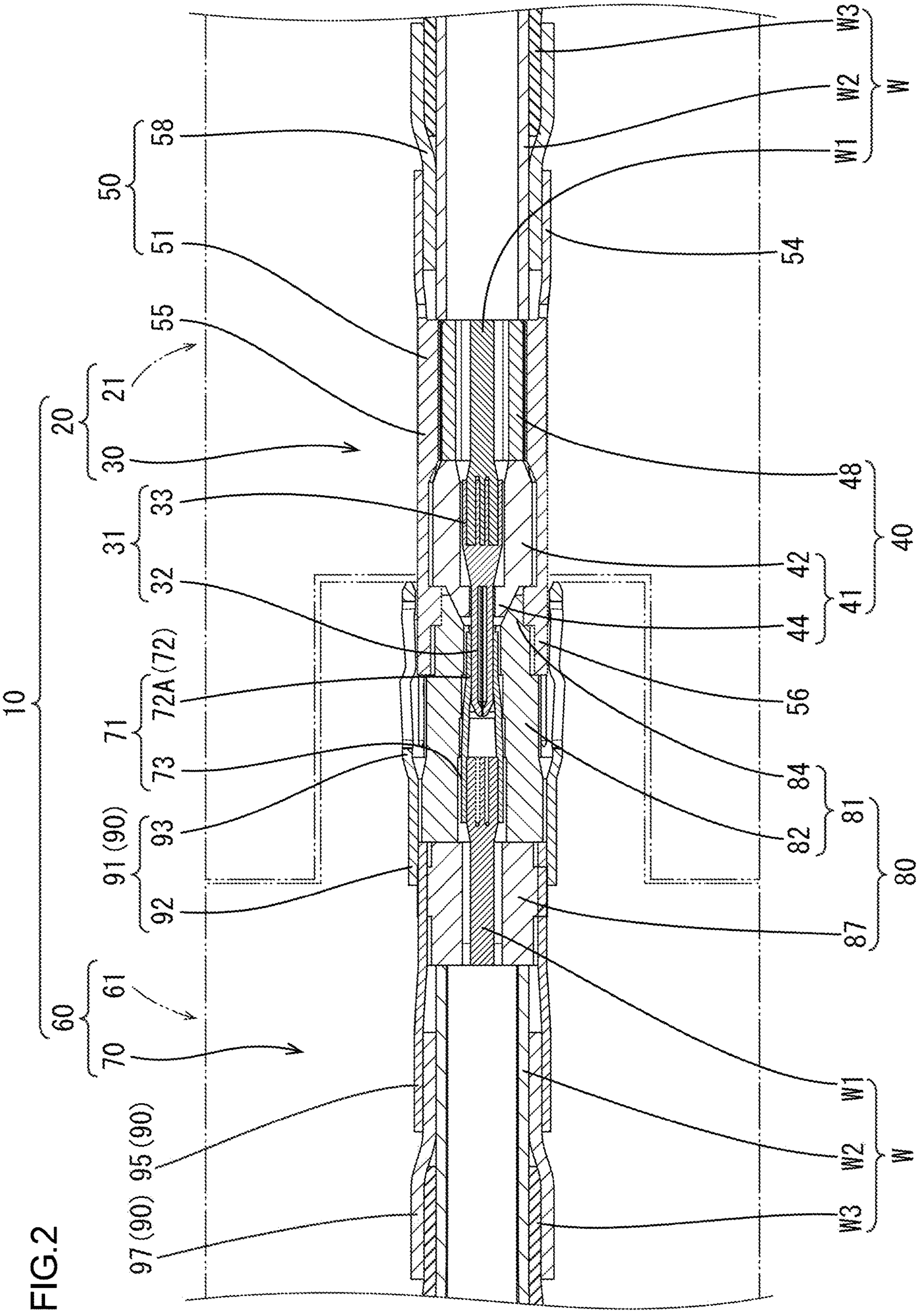
FIG. 2 is a cross-sectional view of the connector taken along line A-A in FIG. 1.

As illustrated in FIGS. 1 and 2, the connector 10 includes a male connector 20 and a female connector 60. The male connector 20 is to be connected to an end of a shielded electric wire W. The female connector 60 is to be connected to an end of a shielded electric wire W and coupled to the male connector 20. In the following description, as to a front-rear direction, a front side is defined with reference to a coupling direction in which corresponding one of the male connector 20 and the female connector 60 is coupled to other one.

[Shielded Electric Wire W]

As illustrated in FIG. 2, the shielded electric wire W is a coaxial cable that includes a cable core wire W1, a braided member W2, and an outer cover W3. The outer periphery of the cable core wire W1 is covered with the braided member W2 and the outer periphery of the braided member W2 is covered with the outer cover W3. The braided member W2 and the outer cover W3 are removed from the shielded electric wire W in the front end portion thereof and the insulation member is also removed and the cable core wire W1 is exposed. Only the outer cover W3 is removed from the shielded electric wire W in the portion behind the exposed cable core wire W1 and the braided member W2 is exposed.

[Male Connector 20]

As illustrated in FIGS. 1 and 2, the male connector 20 includes a male housing 21 and a male terminal module 30.

[Male Housing 21]

The male housing 21 is a tubular member that is made of insulating synthetic resin. The male housing 21 can receive the male terminal module 30 from a rear side. The male housing 21 includes a stopper, which is not illustrated, therein. When the male terminal module 30 reaches a correct position within the male housing 21, the male terminal module stops at the stopper. Accordingly, the male terminal module 30 is held in the male housing 21 so as not to come out therefrom.

[Male Terminal Module 30]

As illustrated in FIG. 2, the male terminal module 30 includes a male-side inner conductor 31, a male-side derivative 40, and a male-side outer conductor 50.

[Male-Side Inner Conductor 31]

Figure 3:
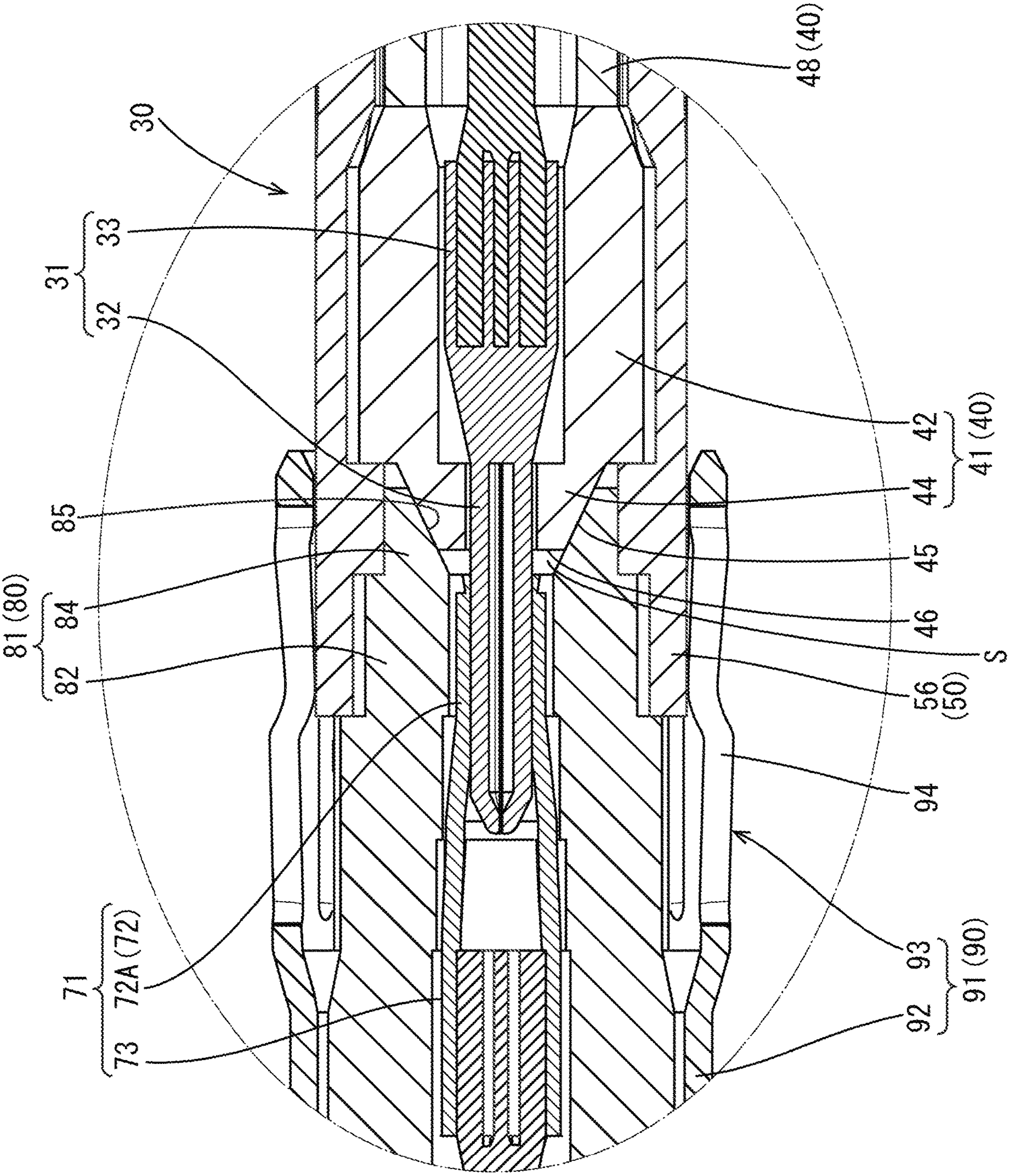
FIG. 3 is an enlarged cross-sectional view of a portion of FIG. 2.
Figure 8:
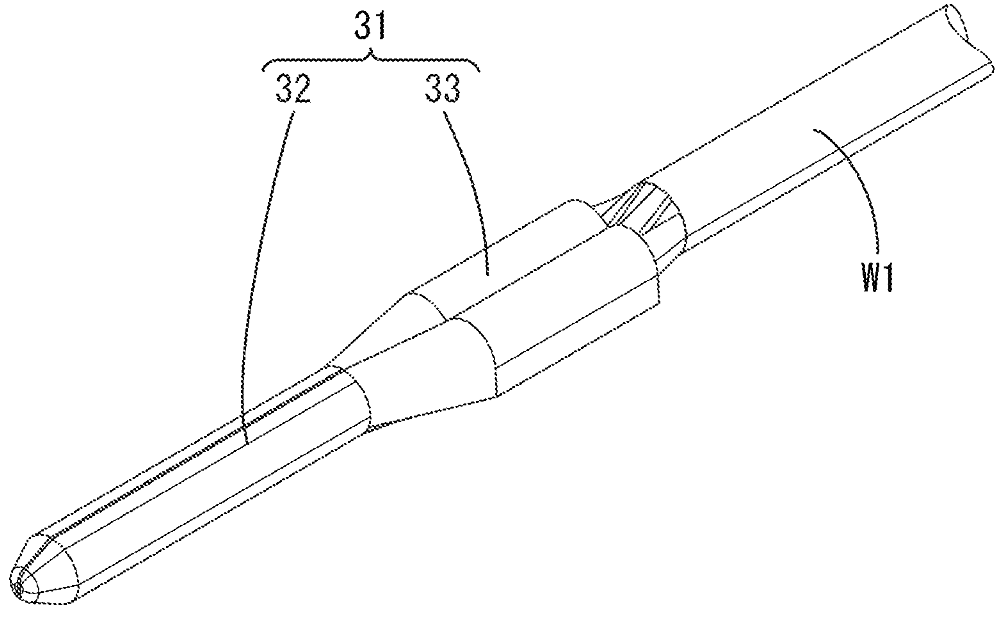
FIG. 8 is a perspective view illustrating a male-side inner conductor that is connected to a cable core wire.

The male-side inner conductor 31 is formed by processing an electric conductive metal plate. As illustrated in FIGS. 2, 3, and 8, the male-side inner conductor 31 includes a male connection portion 32 and an electric wire connection portion 33 that is behind the male connection portion 32.

The male connection portion 32 has a pin shape that extends in the front-rear direction. The male connection portion 32 is connected to a female-side inner conductor 71 that is arranged in a female-side derivative 80 of the female connector 60, which will be described later, when the male connector 20 and the female connector 60 are coupled together.

As illustrated in FIG. 8, the electric wire connection portion 33 is crimped on and fixed to the cable core wire W1 that is exposed at a distal end of the shielded electric wire W. Thus, the male-side inner conductor 31 is electrically connected to the cable core wire W1 of the shielded electric wire W.

[Male-Side Derivative 40]

As illustrated in FIGS. 2 and 3, the male-side derivative 40 is a tubular member that is made of insulating synthetic resin having predefined relative permittivity.

The male-side derivative 40 receives the exposed cable core wire W1 and the male-side inner conductor 31 therein. The exposed cable core wire W1 extends frontward from the insulator and the braided member W2. The male-side inner conductor 31 is connected to the exposed cable core wire W1. The male-side derivative 40 includes a male-side front derivative 41 and a male-side rear derivative 48 that is behind the male-side front derivative 41.

As illustrated in FIGS. 3 and 5 to 7, the male-side front derivative 41 has a tubular shape that is elongated in the front-rear direction. The male-side front derivative 41 includes a male-side body portion 42 and a male-side fitting portion 44 that is continuous frontward from the male-side body portion 42.

The male-side body portion 42 has a circular tube shape that extends in the front-rear direction. The male-side body portion 42 can receive the electric wire connection portion 33 of the male-side inner conductor 31 therein.

The male-side fitting portion 44 protrude frontward from a front end of the male-side body portion 42.

The male connection portion 32 is inserted frontward through the male-side fitting portion 44 in the front-rear direction so as to protrude from the male-side fitting portion 44. The male-side fitting portion 44 has a first tapered surface 45 and a distal end surface 46.

The first tapered surface 45 is sloped to have a conical shape and sloped closer to an axis of the male-side fitting portion 44 as it extends frontward from the front end of the male-side body portion 42. The first tapered surface 45 extends around an entire periphery of the male connection portion 32 to surround the male connection portion 32 when the male connection portion 32 is inserted through the male-side fitting portion 44.

The distal end surface 46 is at the front end portion of the first tapered surface 45 and has a circular ring shape seen from the front such that the distal end surface 46 extends perpendicular to the axis of the male-side fitting portion 44. When the male connection portion 32 is inserted through the male-side fitting portion 44, the male connection portion 32 protrudes frontward from the distal end surface 46.

As illustrated in FIG. 2, the male-side rear derivative 48 is fitted to the outer periphery of the cable core wire W1 that is exposed and extends from the braided member W2 in the shielded electric wire W. A male-side outer conductor 50, which will be described later, is fitted to the outer periphery of the male-side rear derivative 48 and pressed such that the male-side rear derivative 48 is disposed around the outer periphery of the cable core wire W1 and surrounds the entire periphery of the cable core wire W1. A space is provided between the cable core wire W1 and the male-side rear derivative 48 for adjusting the impedance.

[Male-Side Outer Conductor 50]

Figure 4:
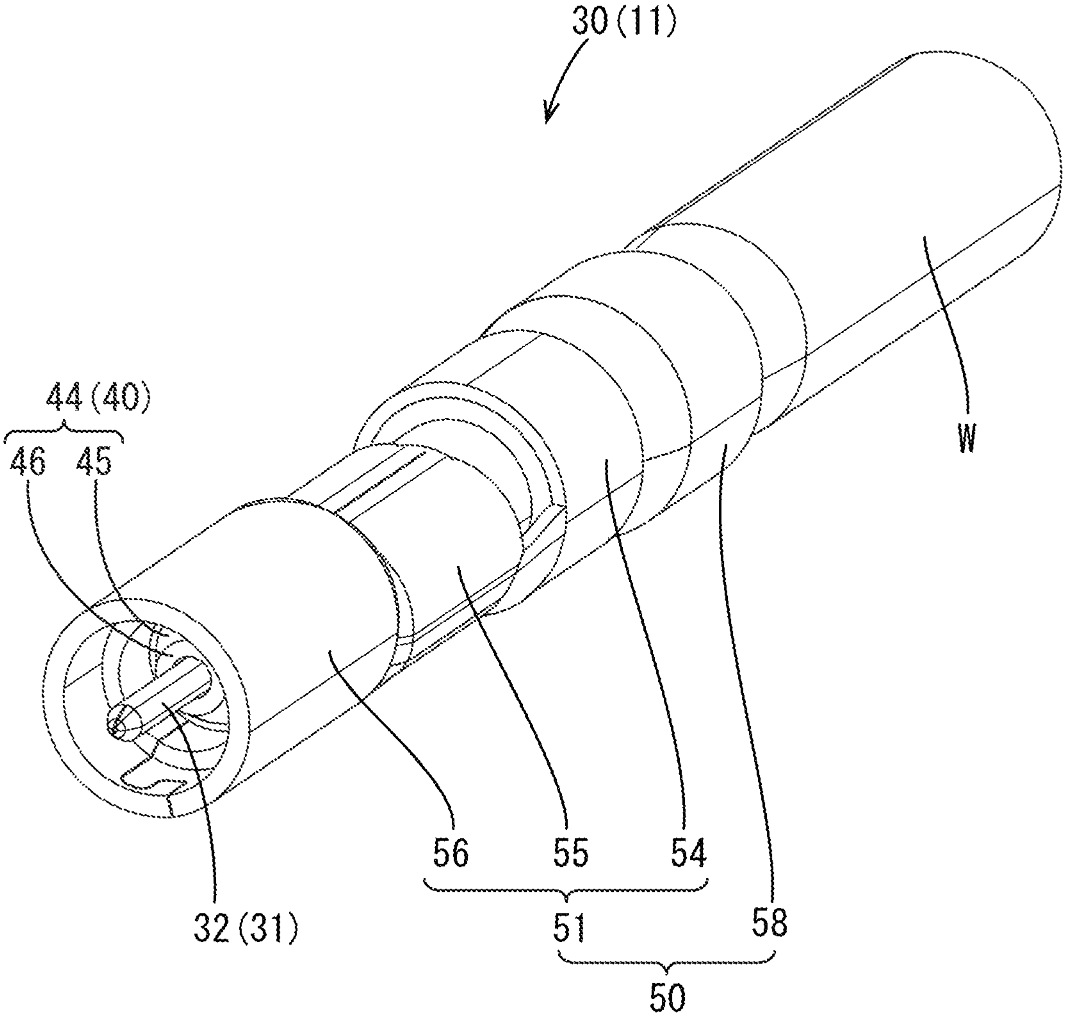
FIG. 4 is a perspective view of a male terminal module.

The male-side outer conductor 50 is formed by processing an electric conductive metal plate. As illustrated in FIGS. 2 and 4, the male-side outer conductor 50 includes a male-side front outer conductor 51 and a male-side rear outer conductor 58 to which the male-side front outer conductor 51 is fitted from outside.

The male-side rear outer conductor 58 has a tubular shape and extends in the outer peripheral area ranging from the exposed braised member W2 to the front end portion of the outer cover W3 of the shielded electric wire W. The front portion of the male-side rear outer conductor 58 is crimped on and fixed to the braided member W2 to be electrically connected to the braided member W2. The rear portion of the male-side rear outer conductor 58 is crimped and fixed to the outer cover W3 and is fixed to the shielded electric wire W.

As illustrated in FIG. 2, the male-side front outer conductor 51 is a tubular member that has a diameter almost same as that of the male-side rear outer conductor 58. The male-side front outer conductor 51 extends in the outer peripheral area ranging from the front end portion of the male-side rear outer conductor 58 to the middle section of the male-side inner conductor 31 in the front-rear direction. The rear end portion of the male-side front outer conductor 51 is a conductor crimp portion 54 of a barrel shape and the conductor crimp portion 54 is crimped on the front end portion of the male-side rear outer conductor 58. The conductor crimp portion 54 is crimped on the male-side rear outer conductor 58 such that the male-side front outer conductor 51 and the male-side rear outer conductor 58 are integrally configured as the male-side outer conductor 50.

The male-side front outer conductor 51 includes a middle crimp portion 55 in a middle section thereof with respect to the front-rear direction. The middle crimp portion is crimped on the outer periphery of the male-side rear derivative 48. The middle crimp portion 55 has a small inner diameter so as not to overpressure the male-side rear derivative 48 (such that the space between the cable core wire W1 and the male-side rear derivative 48 is not decreased) in the crimping on the male-side rear derivative 48.

As illustrated in FIGS. 2 and 3, the front end portion of the male-side front outer conductor 51 is a connection tubular portion 56 that is a circular tube. The connection tubular portion 56 is disposed to surround the outer peripheries of the male-side front derivative 41 and the male connection portion 32 and receive therein the portion ranging from the rear end portion of the male-side front derivative 41 to the middle portion of the male connection portion 32 in the front-rear direction.

Therefore, as illustrated in FIG. 2, the male-side outer conductor 50 covers the portion ranging from the middle portion of the male connection portion 32 in the front-rear direction to the front end portion of the outer cover W3 while being connected to the braided member W2 of the shielded electric wire W.

[Female Connector 60]

As illustrated in FIGS. 1 and 2, the female connector 60 includes a female housing 61 and a female terminal module 70.

[Female Housing 61]

The female housing 61 is a tubular member that is made of insulating synthetic resin. The female housing 61 can receive the female terminal module 70 from a rear side. The female housing 61 includes a stopper, which is not illustrated, therein. When the female terminal module 70 reaches a correct position within the female housing 61, the female terminal module 70 stops at the stopper. Accordingly, the female terminal module 70 is held in the female housing 61 so as not to come out therefrom.

[Female Terminal Module 70]

As illustrated in FIGS. 1 and 2, the female terminal module 70 is coupled to the male terminal module 30 when the male connector 20 and the female connector 60 are coupled together. Therefore, the female terminal module 70 and the male terminal module 30 are configured as a portion of the connector 10. As illustrated in FIG. 2, the female terminal module 70 includes a female-side inner conductor 71, a female-side derivative 80, and a female-side outer conductor 90.

[Female-Side Inner Conductor 71]

Figure 12:
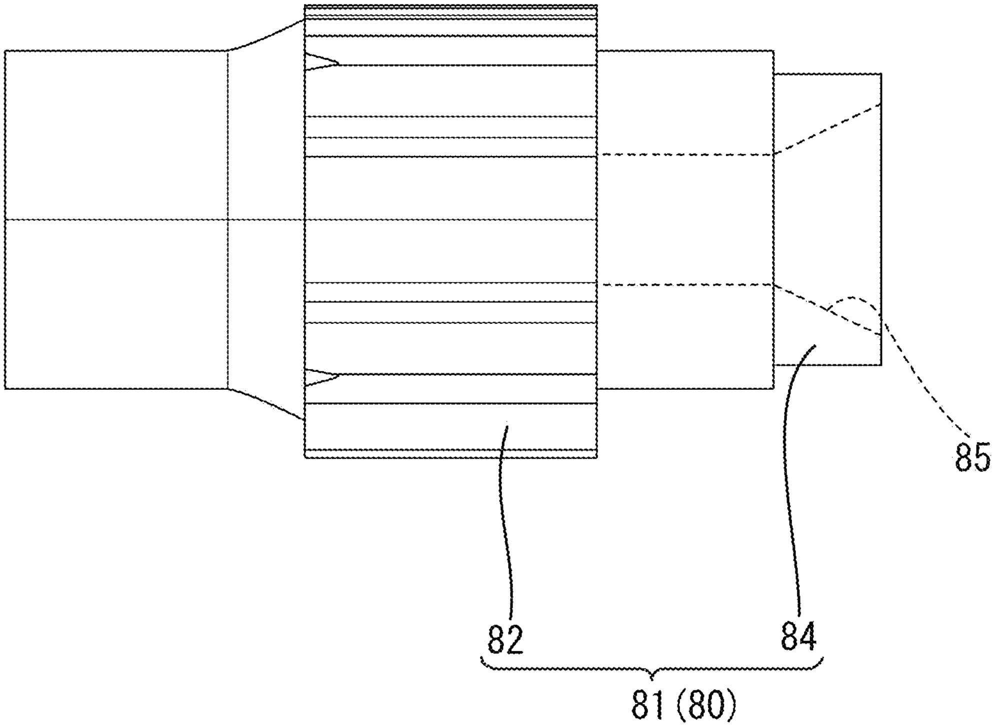
FIG. 12 is a side view of the female-side front derivative.

The female-side inner conductor 71 is formed by processing an electric conductive metal plate. As illustrated in FIGS. 2, 3, and 12, the female-side inner conductor 71 includes an elastic connection portion 72 and an electric wire connection portion 73 that is behind the elastic connection portion 72.

Figure 9:
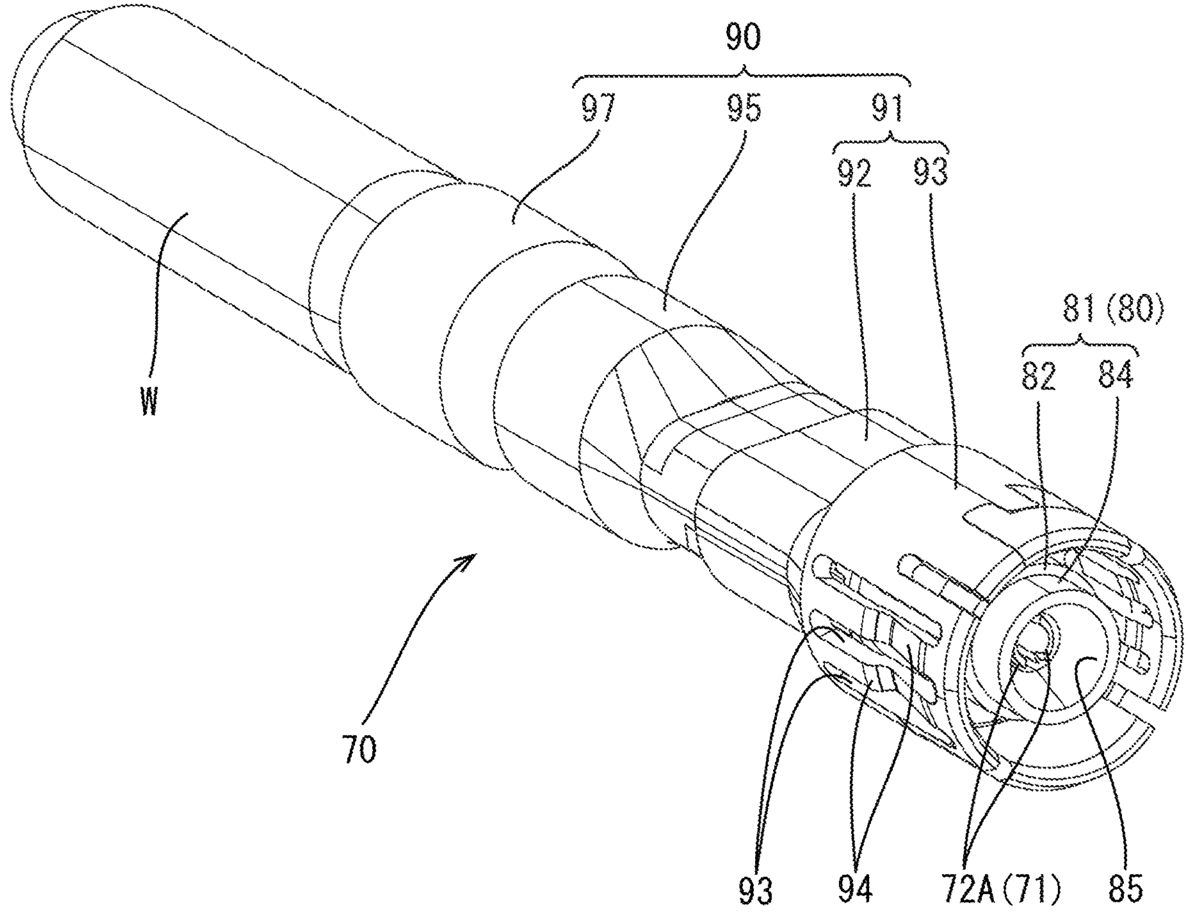
FIG. 9 is a perspective view of a female terminal module.
Figure 13:
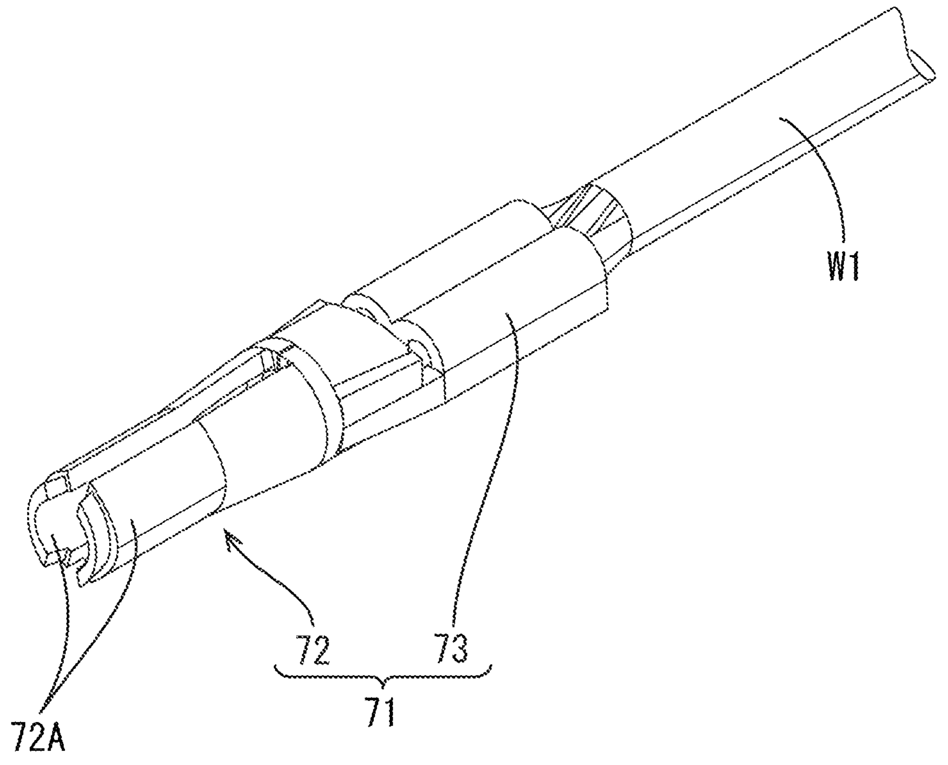
FIG. 13 is a perspective view illustrating a female-side inner conductor that is connected to a cable core wire.

As illustrated in FIGS. 9 and 13, the elastic connection portion 72 includes two elastic pieces 72A that are opposite each other. The elastic pieces 72A are elastically movable to be away from each other. The male connection portion 32 is inserted from a front side to a space between the elastic pieces 72A during the coupling process of the male connector 20 and the female connector 60. After the coupling of the male connector 20 and the female connector 60, as illustrated in FIG. 3, the elastic pieces 72A are elastically contacted with the male connection portion 32, and the female-side inner conductor 71 and the male-side inner conductor 31 are electrically connected.

As illustrated in FIG. 13, the electric wire connection portion 73 is crimped on and fixed to the cable core wire W1 that is exposed at a distal end of the shielded electric wire W. Thus, the female-side inner conductor 71 is electrically connected to the cable core wire W1 of the shielded electric wire W.

[Female-Side Derivative 80]

As illustrated in FIGS. 2 and 3, the female-side derivative 80 is a tubular member that extends in the front-rear direction and is made of insulating synthetic resin having predefined relative permittivity. The female-side derivative 80 receives the exposed cable core wire W1 and the female-side inner conductor 71 therein. The exposed cable core wire W1 extends frontward from the braided member W2. The female-side inner conductor 71 is connected to the exposed cable core wire W1. The female-side derivative 80 includes a female-side front derivative 81 and a female-side rear derivative 87 that is behind the female-side front derivative 81.

As illustrated in FIGS. 3 and 10 to 12, the female-side front derivative 81 has a tubular shape that is elongated in the front-rear direction. The female-side front derivative 81 includes a female-side body portion 82 and a female-side fitting portion 84.

The female-side body portion 82 has a smaller diameter in the front and rear end portions than in the middle portion with respect to the front-rear direction. The female-side body portion 82 receives the elastic connection portion 72 of the female-side inner conductor 71 in the area ranging from the front end portion to the middle portion with respect to the front-rear direction. The female-side body portion 82 receives the electric wire connection portion 73 of the female-side inner conductor 71 in the rear end portion thereof. As illustrated in FIG. 2, the rear end portion of the female-side body portion 82 is compressed in an upper-lower direction and fixed to the electric wire connection portion 73 by crimping of a female-side front outer conductor 91 of the female-side outer conductor 90.

As illustrated in FIGS. 3, and 10 to 12, the female-side fitting portion 84 has a circular tube shape that protrudes frontward from the front end portion of the female-side body portion 82. The female-side fitting portion 84 includes a recess having an inner surface of a conical shape such that an inner diameter of the recess is decreased as the inner surface extends toward a recessed bottom (rearward). Therefore, the inner space of the female-side fitting portion 84 becomes smaller as it is closer to the rear portion. The inner surface of the female-side fitting portion 84 is a second tapered surface 85 that is sloped closer to an axis of the female-side fitting portion 84 as it extends to the rear side from the front side.

An inclination angle of the second tapered surface is same as an inclination angle of the first tapered surface 45 of the male-side fitting portion 44 of the male-side derivative 40. In this description, the configuration in which the inclination angle of the second tapered surface 85 is same as the inclination angle of the first tapered surface 45 includes a configuration in which the inclination angle of the second tapered surface 85 is same as the inclination angle of the first tapered surface 45 and a configuration in which the inclination angle of the second tapered surface 85 is not same as the inclination angle of the first tapered surface 45 but is considered to be substantially same as the inclination angle of the first tapered surface 45.

The male-side fitting portion 44 of the male-side derivative 40 is inserted into the female-side fitting portion 84 from a front side during the coupling process of the male connector 20 and the female connector 60. After the coupling of the male connector 20 and the female connector 60, as illustrated in FIGS. 2 and 3, the first tapered surface 45 of the male-side fitting portion 44 is closely contacted with the second tapered surface 85 of the female-side fitting portion 84 over the entire peripheries thereof. Namely, since the first tapered surface 45 and the second tapered surface are closely contacted with each other over the entire peripheries thereof, no gap is between the first tapered surface 45 and the second tapered surface 85.

Since the female-side fitting portion 84 has a smaller space as it extends in the rear portion, a space S that is created in the rear portion of the female-side fitting portion 84 is small when the male connector 20 and the female connector 60 are coupled together.

As illustrated in FIG. 2, the female-side rear derivative 87 is fitted to the outer periphery of the cable core wire W1 that is exposed and extends from the braided member W2 in the shielded electric wire W. A female-side outer conductor 90, which will be described later, is fitted to the outer periphery of the female-side rear derivative 48 and pressed such that the female-side rear derivative 87 is disposed around the outer periphery of the cable core wire W1 and surrounds the entire periphery of the cable core wire W1. A space is provided between the cable core wire W1 and the female-side rear derivative 87 for adjusting the impedance.

[Female-Side Outer Conductor 90]

The female-side outer conductor 90 is formed by processing an electric conductive metal plate. As illustrated in FIGS. 1, 2 and 9, the female-side outer conductor 90 includes a female-side front outer conductor 91, a female-side middle outer conductor 95, and a female-side rear outer conductor 97.

The female-side rear outer conductor 97 has a tubular shape and extends in the outer peripheral area ranging from the exposed braised member W2 to the front end portion of the outer cover W3 of the shielded electric wire W. The front portion of the female-side rear outer conductor 97 is crimped on and fixed to the braided member W2 to be electrically connected to the braided member W2. The rear portion of the female-side rear outer conductor 97 is crimped on the outer cover W3 and is fixed to the shielded electric wire W.

As illustrated in FIGS. 2 and 9, the female-side middle outer conductor 95 is a tubular member that has a diameter almost same as that of the female-side rear outer conductor 97. The female-side middle outer conductor 95 extends in the outer peripheral area ranging from the front end portion of the female-side rear derivative 87 to the front end portion of the female-side rear outer conductor 97. The front portion of the female-side middle outer conductor 95 is crimped on the female-side rear derivative 87 so as not to overpressure the female-side rear derivative 87. The rear portion of the female-side middle outer conductor 95 is crimped on the front portion of the female-side rear outer conductor 97 to be electrically connected to the female-side rear outer conductor 97.

As illustrated in FIGS. 2 and 9, the female-side front outer conductor 91 is a tubular member that has a diameter almost same as that of the female-side middle outer conductor 95. The female-side front outer conductor 91 extends in the outer peripheral area ranging from the front end portion of the female-side middle outer conductor 95 to the front end portion of the female-side derivative 80. The rear end portion of the female-side front outer conductor 91 is a tubular crimp portion 92 that is crimped on the front end portion of the female-side middle outer conductor 95 and the rear end portion of the female-side front derivative 81. The tubular crimp portion 92 is crimped on the female-side front derivative 81 such that the female-side front derivative 81 is fixed to the female-side inner conductor 71. The tubular crimp portion 92 is crimped on the female-side middle outer conductor 95 such that the female-side front outer conductor 91 and the female-side middle outer conductor 95 are electrically connected to each other. Accordingly, the female-side front outer conductor 91, the female-side middle outer conductor 95, and the female-side rear outer conductor are integrally configured as the female-side outer conductor 90.

As illustrated in FIGS. 2 and 3, the front portion of the female-side front outer conductor 91 that is on a front side with respect to the middle portion in the front-rear direction is a connection large-diameter portion 93. The connection large-diameter portion 93 has a tubular shape and is continuous from the front end of the tubular crimp portion 92. The connection large-diameter portion 93 receives the front portion of the female-side front derivative 81 that is on a front side with respect to the middle portion in the front-rear direction.

Therefore, the female-side outer conductor 90 that is connected to the braided member W2 of the shielded electric wire W covers the area ranging from the elastic connection portion 72 of the female-side inner conductor 71 to the front end portion of the outer cover W3.

Namely, as illustrated in FIG. 2, the male connector 20 and the female connector 60 that are coupled together are covered with the male-side outer conductor 50, which has a substantially uniform diameter in the front-rear direction, and the female-side outer conductor 90, which has a substantially uniform diameter in the front-rear direction.

As illustrated in FIGS. 1 and 9, the connection large-diameter portion 93 includes slits 93A that extend in the front-rear direction and elastic connection portions 94 that are between the slits 93A. The elastic connection portions 94 are elastically deformable outward in a radial direction.

As illustrated in FIGS. 2 and 3, the connection tubular portion 56 of the male-side outer conductor 50 can be inserted in a space between the connection large diameter portion 93 and the female-side front derivative 81. The connection tubular portion 56 is inserted in the space between the connection large-diameter portion 93 and the female-side front derivative 81 when the male connector 20 and the female connector 60 are coupled together. When the connection tubular portion 56 that is inserted in the connection large-diameter portion 93 is elastically contacted with the elastic connection portions 94, the female-side outer conductor 90 and the male-side outer conductor 50 are electrically connected to each other.

[Operations and Advantageous Effects of Connector 10]

This embodiment includes the above-described configuration and operations and advantageous effects of the connector 10 will be described next.

Generally, the characteristic impedance is set to a predefined value to perform impedance matching in a transmission line for transmitting high frequency signals.

Figure 15:
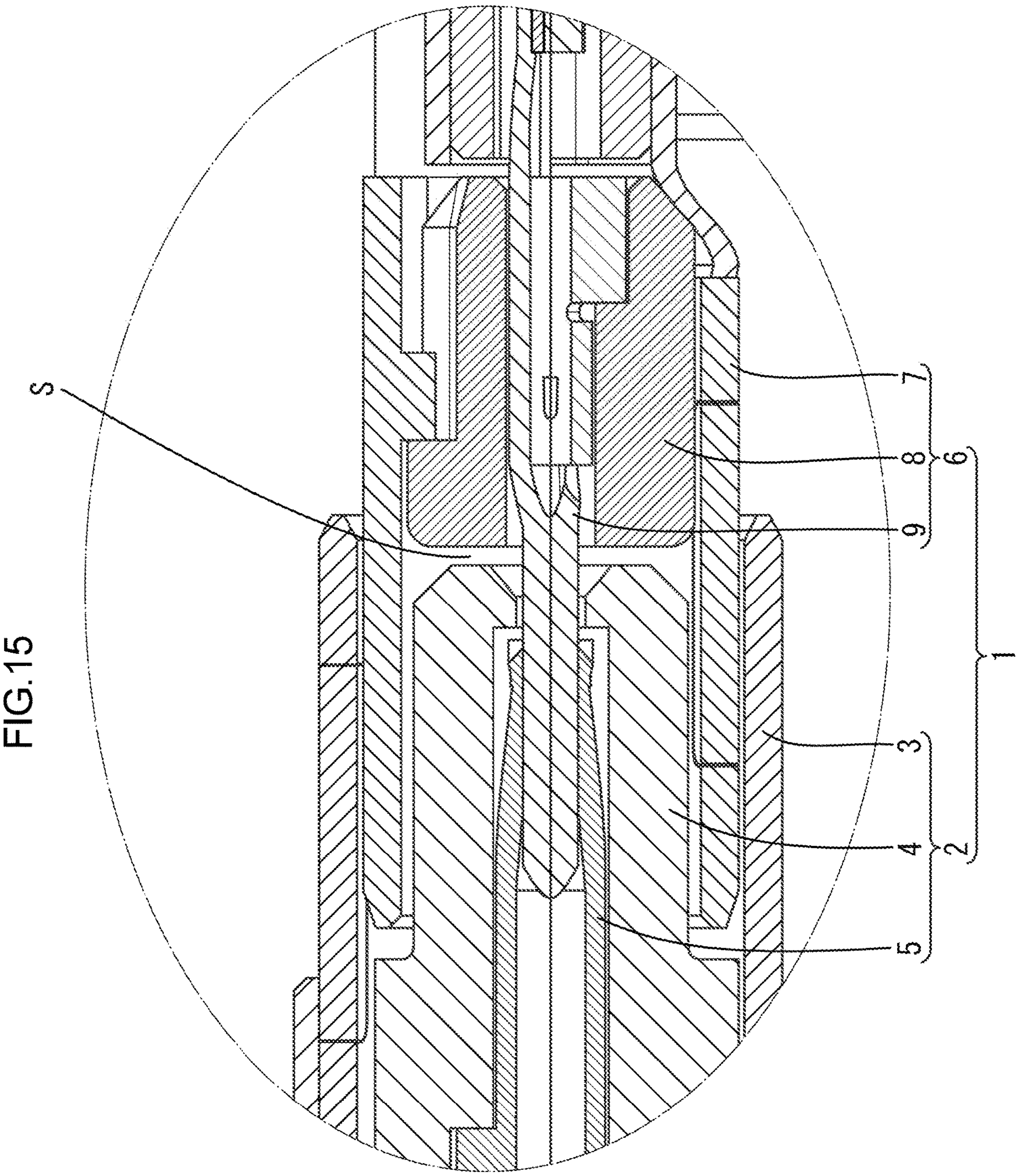
FIG. 15 is an enlarged cross-sectional view of a portion of a connector according to a prior art corresponding to FIG. 3.

As illustrated in FIG. 15, for example, in a connector 1 that includes a female connector 2 and a male connector 6, the female connector 2 and the male connector 6 are coupled. The female connector 2 includes a female-side outer conductor 3 that receives therein a female-side inner conductor 5 via a female-side derivative 4. The male connector 6 includes a male-side outer conductor 7 that receives therein a male-side inner conductor 9 via a male-side derivative 8. After the coupling, the female-side derivative 4 and the male-side derivative 8 are opposite each other in the coupling direction and a male-side inner conductor 9 that protrudes frontward from the male-side derivative 8 is inserted in the female-side derivative 4 and the male-side inner conductor 9 is connected to the female-side inner conductor 5.

However, a space S may be provided between the female-side derivative 4 and the male-side derivative 8 to prevent direct contact between the female-side derivative 4 and the male-side derivative 8 or due to a production tolerance and mounting tolerance. If the space S is created between the female-side derivative 4 and the male-side derivative 8, the male-side inner conductor 9 includes an outer peripheral portion where no derivative 4, 8 is disposed. This changes the relative permittivity of the portion of the male-side inner conductor 9 that is in the space S and the impedance in the male-side inner conductor becomes high. As a result, impedance mismatching is caused in the space S and transmission signals are reflected and this may lower transmission efficiency.

As a result of earnest examination of the present inventors to solve the above problems, they found the configuration of this embodiment. This embodiment relates to the connector 10 that includes the female terminal module 70 and the male terminal module 30 that is to be coupled to the female terminal module 70. The female terminal module 70 includes the electrically conductive female-side inner conductor 71, the insulating female-side derivative 80, and the electrically conductive female-side outer conductor 90. The female-side outer conductor 90 receives therein the female-side inner conductor 71 via the female-side derivative 80. The male terminal module 30 includes the electrically conductive male-side inner conductor 31, the insulating male-side derivative 40, and the electrically conductive male-side outer conductor 50. As illustrated in FIGS. 2 and 3, the male-side outer conductor 50 receives therein the male-side inner conductor 31 via the male-side derivative 40. The male-side outer conductor 50 is connected to the female-side outer conductor 90 when the female terminal module 70 and the male terminal module 30 are coupled together. The female-side derivative 80 includes the female-side fitting portion 84 and the male-side derivative 40 includes the male-side fitting portion 44.

When the female terminal module 70 and the male terminal module 30 are coupled together, as illustrated in FIGS. 2 and 3, the female-side fitting portion 84 and the male-side fitting portion 44 are fitted to each other with recess-protrusion fitting in the coupling direction in which the female terminal module 70 and the male terminal module 30 are coupled together. The male-side inner conductor 31 includes the male connection portion 32 and the male connection portion 32 extends frontward than the male-side fitting portion 44 and toward the female terminal module 70. When the female terminal module 70 and the male terminal module 30 are coupled together, as illustrated in FIG. 2, the male connection portion 32 is inserted in the female-side fitting portion 84 and connected to the female-side inner conductor 71.

According to this embodiment, when the male connection portion 32 protruding from the male-side fitting portion 44 is inserted in the female-side fitting portion 84 and connected to the female-side inner conductor 71 after the coupling of the female terminal module 70 and the male terminal module 30, the female-side fitting portion 84 and the male-side fitting portion 44 are fitted to each other in the coupling direction with the recess-protrusion fitting.

Therefore, at least the male-side fitting portion 44 or the female-side fitting portion 84 is disposed around the male connection portion 32. Accordingly, the relative permittivity is less likely to be changed in the male connection portion 32 and this keeps the impedance change to be small. Therefore, the reflection loss of high frequency signals can be made small and the transmission efficiency is less likely to be lowered in the connector 10.

The male-side fitting portion 44, which is one of the female-side fitting portion 84 and the male-side fitting portion 44, is a protrusion member including the first tapered surface 45. The female-side fitting portion 84, which is another one of the fitting portions, is a recessed member including the second tapered surface 85. The first tapered surface 45 is sloped closer to the axis of the male connection portion 32 as it extends frontward (toward the other fitting portion) and the second tapered surface 85 is sloped closer to the axis of the male connection portion 32 as it extends away from the male-side fitting portion 44 and the second tapered surface 85 extends along the first tapered surface 45.

Generally, a space is provided between a distal end of the male-side fitting portion and a distal end of the female-side fitting portion in a portion where the male connection portion is inserted into the female-side fitting portion. This prevents the distal end of the male-side fitting portion from abutting on the distal end of the female-side fitting portion in the coupling direction and the fitting of the fitting portions is not failed.

For example, if one fitting portion out of the male-side fitting portion and the female-side fitting portion has a circular columnar shape and other fitting portion out of the fitting portions includes a circular columnar recess, a space that is created around the outer periphery of the male connection near a recessed bottom of the recess has a diameter that is same as an inner diameter of the recess. Therefore, the impedance change tends to be great in the male connection.

However, according to this embodiment, the male-side fitting portion 44, which is the one fitting portion, is the protrusion member including the first tapered surface 45 and the female-side fitting portion 84, which is the other fitting portion, is the recessed member including the second tapered surface 85.

Namely, as illustrated in FIG. 3, the female-side fitting portion 84, which is the recessed member, has an inner space that becomes smaller as it is closer to the recessed bottom. This reduces the space S around the outer periphery of the male connection portion 32 near the recessed bottom of the female-side fitting portion 84. Accordingly, the impedance change in the male connection portion 32 can be made much smaller and the reflection loss of high frequency signals in the male connection portion 32 can be further decreased.

Figure 5:
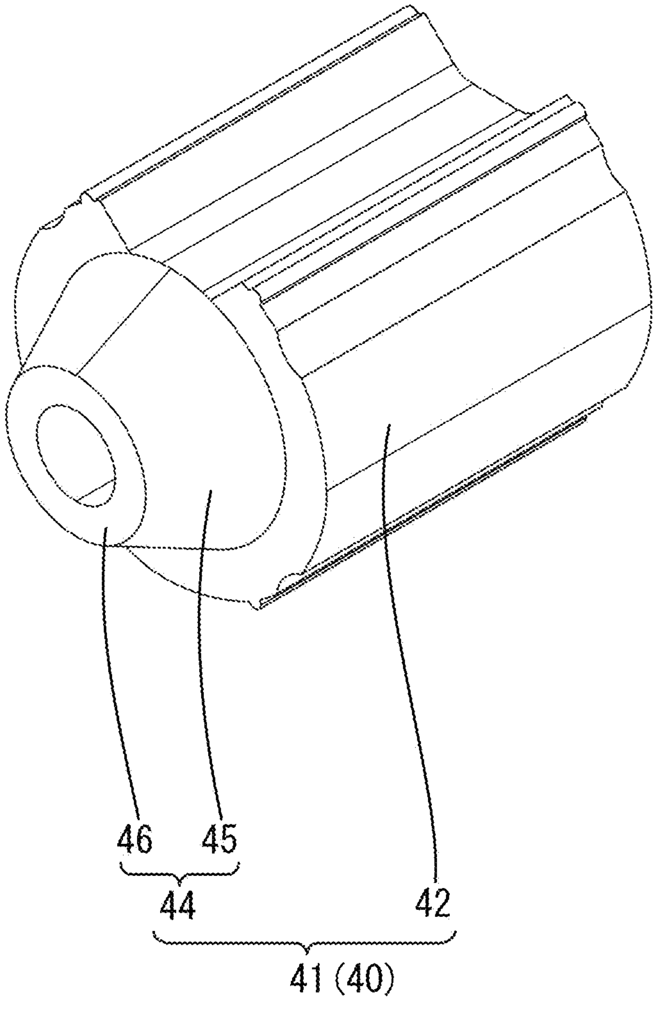
FIG. 5 is a perspective view of a male-side front derivative.
Figure 6:
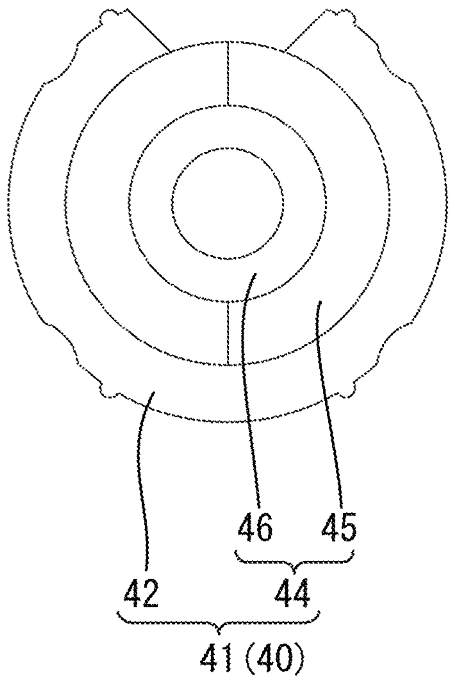
FIG. 6 is a front view of the male-side front derivative.
Figure 7:
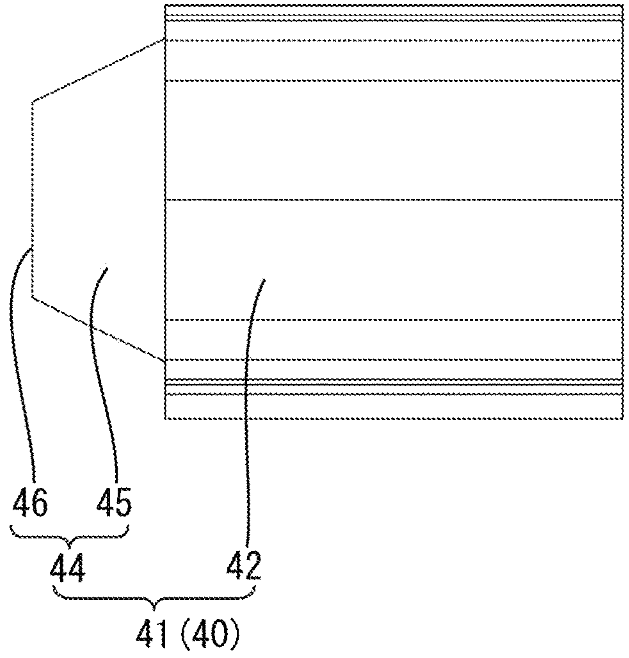
FIG. 7 is a side view of the male-side front derivative.
Figure 10:
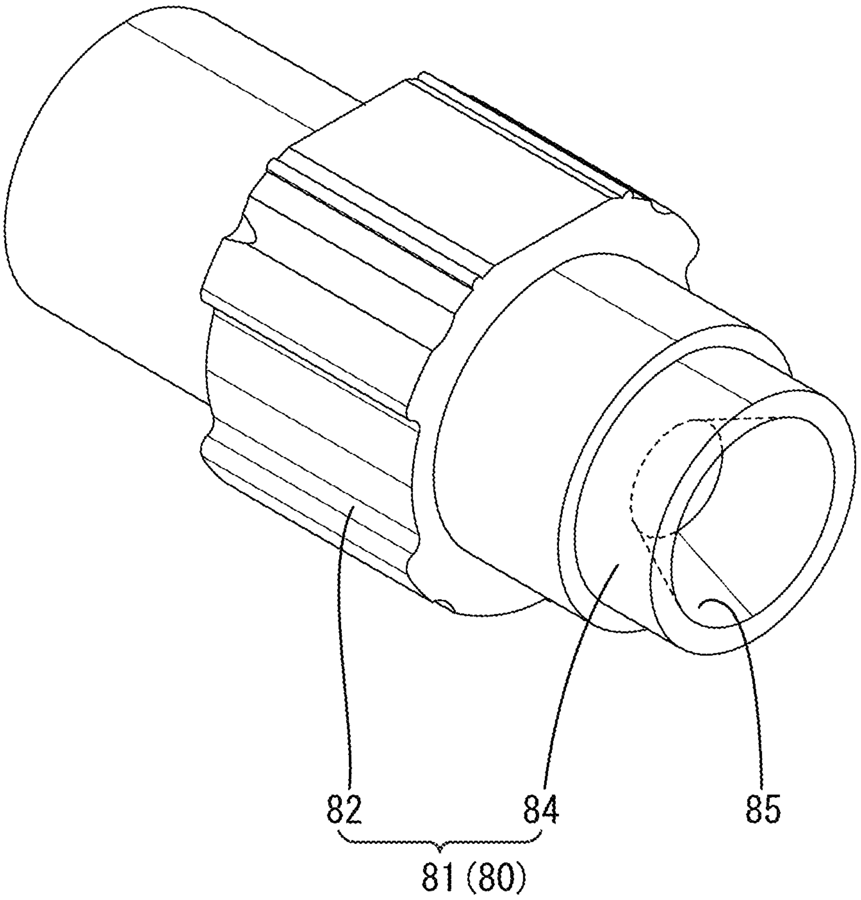
FIG. 10 is a perspective view of a female-side front derivative.
Figure 11:
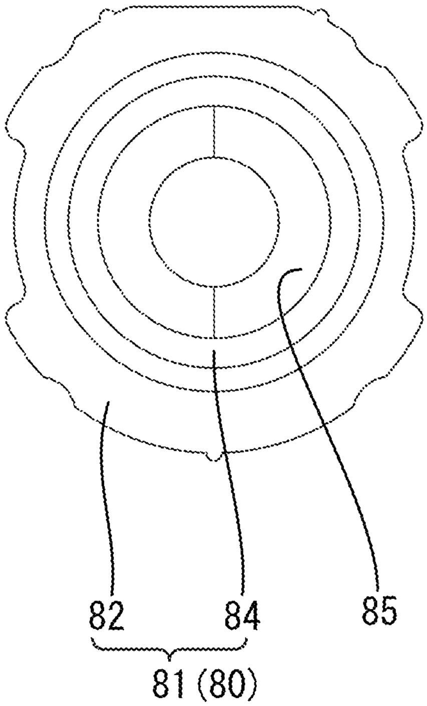
FIG. 11 is a front view of the female-side front derivative.

As illustrated in FIGS. 5 to 7, the first tapered surface 45 is sloped and formed in a conical shape that is tapered toward a distal end. As illustrated in FIGS. 10 to 12, the second tapered surface 85 extends to form a conical shape whose diameter is decreased as it extends toward the recessed bottom of the recess.

Namely, the female-side fitting portion 84, which is the recessed member, has a smaller space around the male connection portion 32 and near the recessed bottom due to the second tapered surface 85. Therefore, as illustrated in FIG. 3, the space between the male-side fitting portion 44 and the female-side fitting portion 84 can be made smaller compared to a configuration including a second tapered surface in a portion of the female-side fitting portion. Accordingly, the impedance change can be made much smaller and the reflection loss of high frequency signals can be further decreased.

As illustrated in FIG. 3, the first tapered surface 45 and the second tapered surface 85 are closely contacted with each other when the female terminal module 70 and the male terminal module 30 are coupled together. Namely, the close contact between the first tapered surface 45 and the second tapered surface 85 further makes the space between the female-side fitting portion 84 and the male-side fitting portion 44 smaller. Accordingly, the impedance change can be made much smaller and the reflection loss of high frequency signals can be further reduced.

As described above, according to this embodiment, at least the female-side derivative 80 or the male-side derivative 40 is arranged around the outer periphery of the male connection portion 32 and a small space is provided between the male-side fitting portion 44 and the female-side fitting portion 84. Namely, in the connector 10 of this embodiment, the impedance change in the male connection portion 32 can be suppressed to be small and the reflection loss of high frequency signals can be reduced and the transmission efficiency is less likely to be lowered.

Other Embodiments

The present disclosure is not limited to the embodiment described above and illustrated in the drawings. The following embodiments may be included in the technical scope of the technology described herein.

(1) In the above embodiment, the shielded electric wire W is a coaxial cable. However, a shielded electric wire may include multiple cable core wires, and a male-side derivative may include multiple male-side fitting portions and a female-side derivative may include multiple female-side fitting portions.

(2) In the above embodiment, the female-side derivative 80 includes two derivatives and the male-side derivative 40 includes two derivatives. However, each of the female-side derivative and the male-side derivative may include a single derivative.

(3) In the above embodiment, the female-side outer conductor 90 includes three outer conductors and the male-side outer conductor 50 includes two outer conductors. However, each of the female-side outer conductor and the male-side outer conductor may include a single outer conductor.

(4) In the above embodiment, the male-side fitting portion 44, which protrudes in a conical shape and includes the first tapered surface, and the female-side fitting portion 84, which includes a conical recess and the second tapered surface 85, are fitted to each other with recess-protrusion fitting in the front-rear direction. However, a female-side fitting portion may protrude in a conical shape and a male-side fitting portion may include a conical recess. The female-side fitting portion may include a recess having a polygonal pyramid shape and the male-side fitting portion may include a protrusion having a polygonal pyramid shape.

Figure 14:
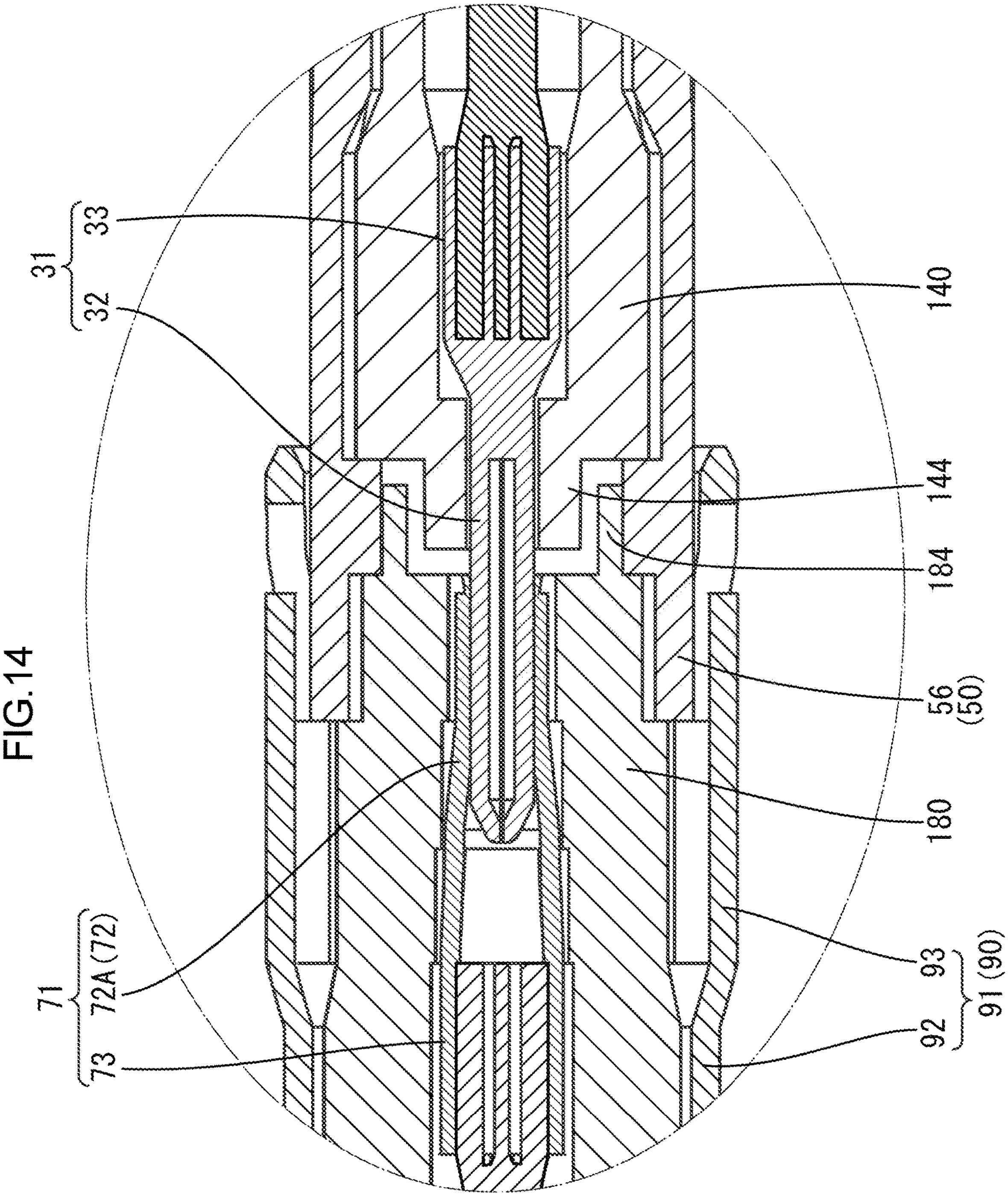
FIG. 14 is an enlarged cross-sectional view of a portion of a connector according to another embodiment corresponding to FIG. 3.

As illustrated in FIG. 14, a male-side derivative 140 may include a male-side fitting portion 144 having a protrusion of a circular columnar shape and a female-side derivative 180 may include a female-side fitting portion 184 having a recess of a circular columnar shape. The male-side fitting portion 144 and the female-side fitting portion 184 may be fitted to each other with recess-protrusion fitting in the front-rear direction. In such a configuration, even if a first tapered surface and a second tapered surface are not completely contacted with each other, a space between the first tapered surface and the second tapered surface can be uniform and a local change of the impedance is less likely to be caused.

EXPLANATION OF SYMBOLS

10: Connector
20: Male connector
23: Male housing
30: Male terminal module
31: Male-side inner conductor
32: Male connection portion
33: Electric wire connection portion
40: Male-side derivative
41: Male-side front derivative
42: Male-side body portion
45: First tapered surface
46: Distal end surface
48: Male-side rear derivative
50: Male-side outer conductor
51: Male-side front outer conductor
54: Conductor crimp portion
55: Middle crimp portion
56: Connection tubular portion
58: Male-side rear outer conductor
60: Female connector
61: Female housing
70: Female terminal module
71: Female-side inner conductor
72: Elastic connection portion
72A: Elastic piece
73: Electric wire connection portion
80: Female-side derivative
81: Female-side front derivative
82: Female-side body portion
84: Female-side fitting portion
85: Second tapered surface
87: Female-side rear derivative
90: Female-side outer conductor
91: Female-side front outer conductor
92: Tubular crimp portion
93: Large-diameter portion
93A: Slit
94: Elastic connection portion
95: Female-side middle outer conductor
97: Female-side rear outer conductor
W1: Cable core wire
W2: Braided member
W3: Outer cover
W: Shielded electric wire

The invention claimed is:

1. A connector comprising:

a female terminal module comprising:

a female-side inner conductor that is electrically conductive;

a female-side derivative that has insulating properties and includes a female-side fitting portion; and a female-side outer conductor that is electrically conductive, and receives therein the female-side inner conductor via the female-side derivative; and a male terminal module coupled to the female terminal module and comprising:

a male-side derivative that has insulating properties and includes a male-side fitting portion;

a male-side inner conductor that is electrically conductive and includes a male connection portion, the male connection portion extending further than the male-side fitting portion toward the female terminal module; and a male-side outer conductor that is electrically conductive, and receives therein the male-side inner conductor via the male-side derivative and is connected to the female-side outer conductor when the female terminal module and the male terminal module are coupled together, wherein when the female terminal module and the male terminal module are coupled together in a coupling direction, the female-side fitting portion and the male-side fitting portion are fitted to each other in the coupling direction with recess-protrusion fitting, and the male connection portion is inserted in the female-side fitting portion and connected to the female-side inner conductor, one fitting portion out of the female-side fitting portion and the male-side fitting portion is a protrusion member and includes a first tapered surface, and another fitting portion out of the female-side fitting portion and the male-side fitting portion is a recessed member and includes a second tapered surface, the first tapered surface is sloped to be closer to an axis of the male connection portion as it extends closer to the recessed member, the second tapered surface is sloped to be closer to the axis of the male connection portion as it extends farther away from the protrusion member, the second tapered surface interfaces the first tapered surface, and only a length of the second tapered surface extends along a length of the first tapered surface, thereby interfacing the second tapered surface, the first tapered surface of the female-side fitting portion and the second tapered surface of the male-side fitting portion are connected to interface each other, a gap is provided between a distal end of the male-side fitting portion and a distal end of the female-side fitting portion in a portion where the male connection portion is inserted into the female-side fitting portion, and the gap extends from the distal end of the male-side fitting portion to a proximal end of the female-side fitting portion.

2. The connector according to claim 1, wherein the first tapered surface is formed in a conical shape that is tapered toward a distal end of the protrusion member, and the second tapered surface is formed in a conical shape whose diameter is reduced as it extends closer to a recessed bottom of the recessed member.

3. The connector according to claim 1, wherein the first tapered surface and the second tapered surface are closely contacted with each other when the female terminal module and the male terminal module are coupled together.

4. The connector according to claim 1, further comprising:

a female housing in which the female terminal module is arranged; and a male housing in which the male terminal module is arranged and that can be coupled to the female housing.

* * * * *